P. W. STANKEE.
HOG FARROWING GUARD RAIL.
APPLICATION FILED AUG. 2, 1920.
Reissued Feb. 14, 1922. 15,287.
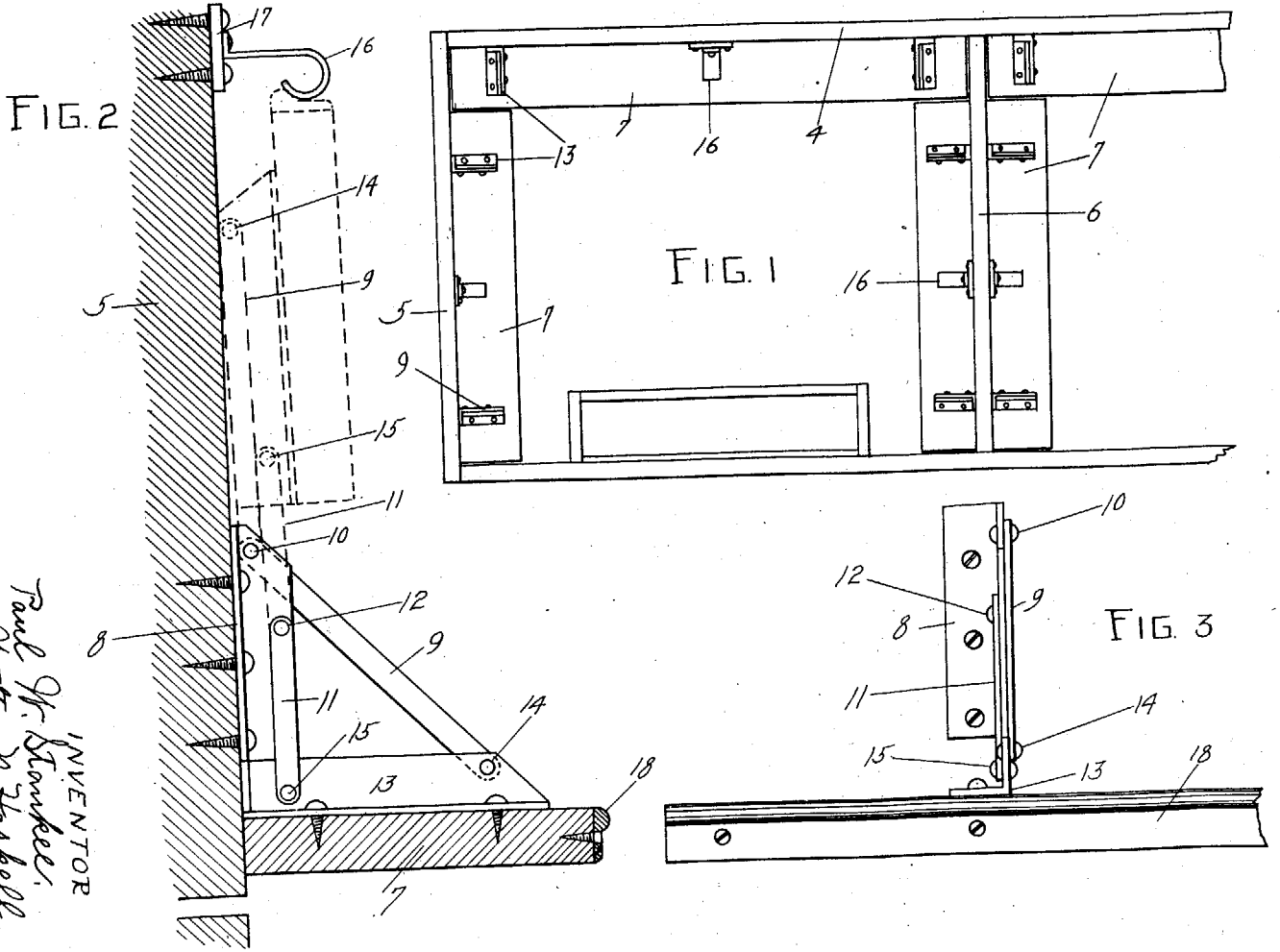
INVENTOR
Paul W. Stankee.
BY Walter N. Haskell
his ATTORNEY

UNITED STATES PATENT OFFICE.

PAUL W. STANKEE, OF DAVENPORT, IOWA.

HOG-FARROWING GUARD RAIL.

15,287. Specification of Reissued Letters Patent. Reissued Feb. 14, 1922.

Original No. 1,318,815, dated October 14, 1919, Serial No. 267,510, filed December 19, 1918. Application for reissue filed August 2, 1920. Serial No. 400,852.

*To all whom it may concern:*

Be it known that I, PAUL W. STANKEE, a citizen of the United States, residing at Davenport, in the county of Scott and State of Iowa, have invented certain new and useful Improvements in Hog-Farrowing Guard Rails, of which the following is a specification.

This invention relates to folding supports, and is specially fitted for use in connection with guard rails for hog pens, which are designed to prevent the crushing of small pigs against the walls of a pen by the mother hog. In the drawings and specification herein the device is more particularly set forth in its adaptation to such a use. In this connection one of the objects of the invention is to provide a guard rail of simple and improved construction, which will be strong and durable, so as not to be broken or rendered useless by the mother hog, and which may be easily and quickly folded against the side wall of the pen in order that the area of the pen may be increased if desired.

My invention is not limited, however, to the use above mentioned, but it may be adapted for use in various other places.

With the foregoing objects in view, together with others which may suggest themselves to one skilled in the art to which the invention pertains, such invention resides in the novel construction, combination, and arrangement of parts, as will be more fully described hereinafter, illustrated in the drawings, and particularly pointed out in the claims.

In the drawings:

Fig. 1 is a plan view of a conventional pig pen containing guard-rails supported by my invention.

Fig. 2 is an enlarged sectional view through one of the guard rails and its supporting base.

Fig. 3 is a front elevation of a part of a guard rail, with one of the supports attached thereto.

Referring now more particularly to the drawings, 4 indicates the side walls of a conventional hog pen, and 5 the end wall of the pen, which in the present instance is of that type wherein partitions 6 are used to provide compartments to be occupied by hogs or pigs which it is desired to keep separated, only one of such partitions or dividing walls being shown.

Guard rails are indicated at 7, and comprise stout timbers or beams of any desired thickness and breadth. These beams may be formed of planking, and it is desired that the same when in operative position be spaced about eight inches above the floor of the pen.

Arranged in spaced relation upon the inner walls of the pen, as well as upon the opposing faces of the dividing walls, are supporting brackets in form of angle plates 8, the same being disposed vertically. These plates are secured in proper position in any preferred manner, and each has pivoted near its upper end a link 9, the pivots for the links being indicated at 10. It is observed that these pivots are disposed upon the plates near the bases of the same. Each plate or bracket has also pivoted thereto one end of a second link 11, the pivots for the same being indicated at 12. These second links are pivoted to the angle plates below the pivots of the links 9.

The lower ends of the links are pivotally connected to the upwardly extending portion of an angle plate 13 secured to the upper face of the guard rail 7, and these angle plates are disposed laterally of said rails. The lower end of the link 9 is pivoted as at 14 to the upstanding portion of the plate 13 near the outer end thereof, while the lower end of the link 11 is pivoted to said plate at 15 near the inner end. By connecting the links 9—11 with the plates 8—13 in the manner shown and described, it is obvious that the guard rails 7 may be swung upwardly to the position indicated by dotted lines in Fig. 2, and when in such position the pivots 14—15 will assume a position slightly beyond the vertical plane of the pivots 10—12. This particular arrangement enables the rails to remain in upright position and the weight of the rails will be equally distributed to the plates 8—13 through the pivots 10—14—12—15.

To assist in retaining the guard rails in raised position, spring catches 16 are provided. These catches are secured at one end to supporting blocks 17 fastened to the walls of the pen in such position that the free ends of the catches will snap over the forward edges of the guard rails when the latter are in upright position. The free edges of the rails are provided with a protecting strip 18, having a bead for engagement by said catches, said strip also protecting the edge of the rail, and preventing the same from becoming worn or splintered.

From the foregoing description it is obvious that the rails 7 when lowered or swung to a horizontal position will project into the pen the proper distance above the floor of the pen, and it will therefore be impossible for the mother hog in lying down to mash the pigs, either against the floor or wall. Should it be desired to increase the area of the pen the various rails may be grasped and swung upward to the position shown in dotted lines in Fig. 2. The end of each catch 16 will snap over the free edge of its respective rail, and the latter will be securely held in raised position.

With reference to Fig. 1, it is observed that the adjacent ends of the rails carried by the side 4 of the pen are spaced apart a distance such as will permit of the partition or dividing wall being easily removed, and these ends will assist in securing and steadying the partition when the latter is in place.

While the above is a description of the preferred embodiment of the invention, it is obvious that changes in the details may be resorted to without departing from the invention as defined by the claims.

What I claim and desire to secure, is:

1. A device of the class described, comprising a support; plates attached thereto, relatively short links pivoted to the plates; relatively long links pivoted to the plates at points above the pivot points of the short links and beyond the rear vertical side thereof; other plates pivotally connected with the short and long links and located between them; and a guard rail attached to the last mentioned plates.

2. A device of the class described, comprising a pair of plates adapted for attachment to separate objects, and a pair of links having a pivotal connection with each of said plates so as to permit the same to be positioned normally at a right angle with each other, or to permit said plates to be moved into longitudinal alignment with each other.

3. A device of the class described, comprising a pair of plates adapted for attachment to separate objects, one of which is movable with relation to the other; a pair of links having a pivotal connection with each of said plates so as to permit the same to be positioned at a right angle with relation to each other, or permit said plates to be moved into longitudinal alignment with each other; and means for holding said plates in longitudinal alignment against casual movement.

In testimony of which I affix my signature.

PAUL W. STANKEE.